(12) United States Patent
Tormasov (10) Patent No.: US 8,572,370 B1
(45) Date of Patent: Oct. 29, 2013

(54) ACCESSING A REMOTE VIRTUAL ENVIRONMENT WITHOUT USER AUTHENTICATION

(75) Inventor: Alexander G. Tormasov, Moscow (RU)

(73) Assignee: Parallels IP Holdings GmbH, Schaffhausen (CH)

(*) Notice: Subject to any disclaimer, the term of this patent is extended or adjusted under 35 U.S.C. 154(b) by 646 days.

(21) Appl. No.: 12/340,903

(22) Filed: Dec. 22, 2008

Related U.S. Application Data (60) Provisional application No. 61/016,284, filed on Dec. 21, 2007.

(51) Int. Cl.
*H04L 29/06* (2006.01)
*G06F 15/177* (2006.01)

(52) U.S. Cl.
USPC ............ 713/162; 713/155; 713/165; 709/220

(58) Field of Classification Search
USPC ......................................................... 713/162
See application file for complete search history.

(56) References Cited

U.S. PATENT DOCUMENTS

| | | | | |
|---|---|---|---|---|
| 5,854,841 | A * | 12/1998 | Nakata et al. | 713/152 |
| 6,105,131 | A * | 8/2000 | Carroll | 713/155 |
| 2002/0143906 | A1* | 10/2002 | Tormasov et al. | 709/220 |
| 2004/0123104 | A1* | 6/2004 | Boyen et al. | 713/165 |
| 2007/0174429 | A1* | 7/2007 | Mazzaferri et al. | 709/218 |

OTHER PUBLICATIONS

David Wolinsky et al., 2006. "On the Design of Virtual Machine Sandboxes for Distributed Computing in Wide-area Overlays of Virtual Workstations." In Proceedings of the 2nd International Workshop on Virtualization Technology in Distributed Computing (VTDC '06). IEEE Computer Society, Washington, DC, USA.*

Shuo Tang; Yu Chen; Zheng Zhang; , "Machine Bank: Own Your Virtual Personal Computer," Parallel and Distributed Processing Symposium, 2007. IPDPS 2007. IEEE International , vol., no., pp. 1-10, Mar. 26-30, 2007.*

Sinclair, S.; Smith, S.W.; , "PorKI: making user PKI safe on machines of heterogeneous trustworthiness," Computer Security Applications Conference, 21st Annual , vol., no., pp. 10 pp.-430, Dec. 5-9, 2005.*

Wright, R.; Shifflett, D.J.; Irvine, C.E.; , "Security architecture for a virtual heterogeneous machine," Computer Security Applications Conference, 1998, Proceedings., 14th Annual , vol., no., pp. 167-177, Dec. 7-11, 1998.*

(Continued)

*Primary Examiner* — Carl Colin
*Assistant Examiner* — S. Ali Zaidi
(74) *Attorney, Agent, or Firm* — Bardmesser Law Group (57) ABSTRACT

A method, system and computer program product for providing a secure connection between a client and a remote server to run a Virtual Environment (VE), including (a) establishing a repository for VE content on the remote server; (b) creating a data necessary for the VE to function; (c) generating a two key pairs that includes a VE key pair and a client key pair, wherein the VE key pair includes encryption and decryption keys, the client key pair includes decryption and encryption keys corresponding to encryption and decryption keys of the corresponding VE key pair and the two key pairs are used to provide a full duplex secure network channel between the client and the repository; (d) storing the data necessary for the VE to function as the VE content using data from the VE key pair in the repository; (e) receiving the address for accessing the stored data; and (f) from the client side, using the VE address and the client key pair to start the VE from the data necessary for the VE to function.

11 Claims, 8 Drawing Sheets

(56) References Cited

OTHER PUBLICATIONS

Foster, Ian; Kesselman, Carl; Tuecke, Steven; "The Anatomy of the Grid: Enabling Scalable Virtual Organizations", International Journal of High Performance Computing Applications Fall 2001 vol. 15 No. 3 200-222.*

Walsh, T.; Paciorek, N.; Wong, D.; , "Security and reliability in ConcordiaTM," System Sciences, 1998., Proceedings of the Thirty-First Hawaii International Conference on , vol. 7, no., pp. 44-53 vol. 7, Jan. 6-9, 1998.*

* cited by examiner

ACCESSING A REMOTE VIRTUAL ENVIRONMENT WITHOUT USER AUTHENTICATION

CROSS-REFERENCE TO RELATED APPLICATIONS

This application is a non-provisional of U.S. Provisional Patent Application No. 61/016,284, filed on Dec. 21, 2007, the entire contents of which are hereby incorporated by reference.

BACKGROUND OF THE INVENTION

1. Field of the Invention

This invention relates to a method, system and computer program product for connecting to a remote Virtual Environment without a need for user authentication and identification, and to organizing communication between a client and a server.

2. Description of the Related Art

In a conventional client/server model, there are essentially two ways for a client to interact with a server—where the user is an anonymous user, for example, where a web page that does not require user identification and authentication is requested, and where user authentication is required. A common way to authenticate a user is through the user providing a server with his user ID and a password or via some device like smartcard. More complicated mechanisms involve not just information supplied manually by the user, but also other information that can be derived from the session, such as the user's IP address. Even more complex mechanisms, include providing a random number generating token to a user, where the user, to authenticate himself, needs to provide the numeric value that is displayed on the token, and that numeric value is then matched against the value that the server generates. One problem with this approach is the administrative burden inherent in the centralized administration of user access to his VE.

Figure 2A:
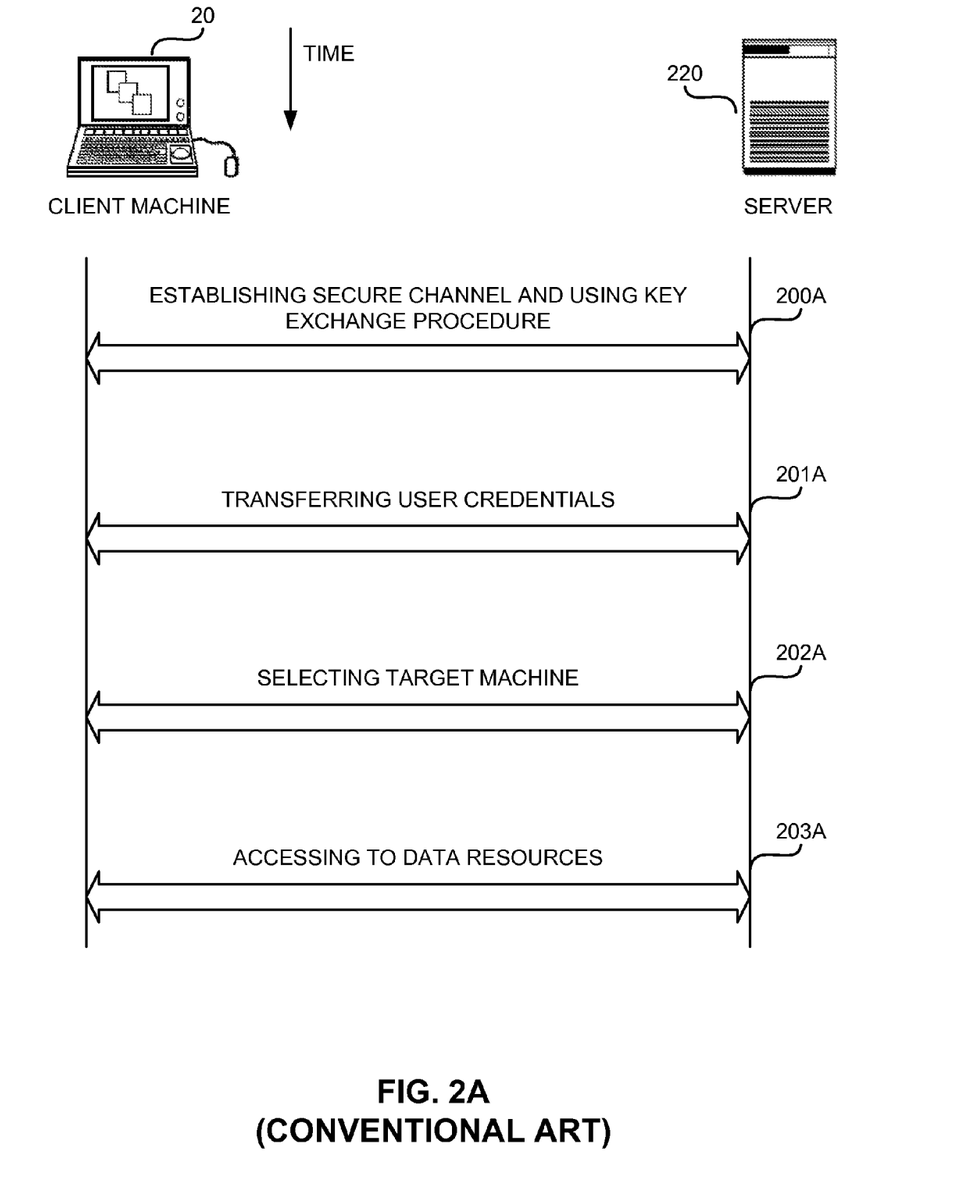
FIG. 2A illustrates a typical conventional scheme for online authentication and encryption.

FIG. 2A illustrates a typical conventional scheme for online authentication and encryption that uses a standard secure socket layer (SSL) protocol, which can be used when a client attempts to access secure data in some remote storage. The SSL protocol provides for authentication and secure transmission of data over the Internet.

The authentication/authorization process typically requires two stages, as shown in FIG. 2A. In step 200A, the client 20 and the server 220 connect. At this point, the encryption/decryption protocols are set up, and cryptographic keys are exchanged. The client and the server establish a connection using a handshake. During the handshake process, the client and the server "agree" regarding the protocol for data exchange and the parameters used for establishing a secure connection, see http://en.wikipedia.org/wiki/Transport_Layer_Security, incorporated herein by reference in its entirety. In step 201A, for both the client and the server to be certain of who is on the other side of the connection, the server requests user credentials from the client, and the client provides the user credentials to the server. The server checks the user credentials, and, if successful, a secure connection to the client is established from a target machine in the repository, see step 202. Having access to protected resources, in step 203, the sending and receiving begin transmission of the data using the secure protocol.

Figure 2B:
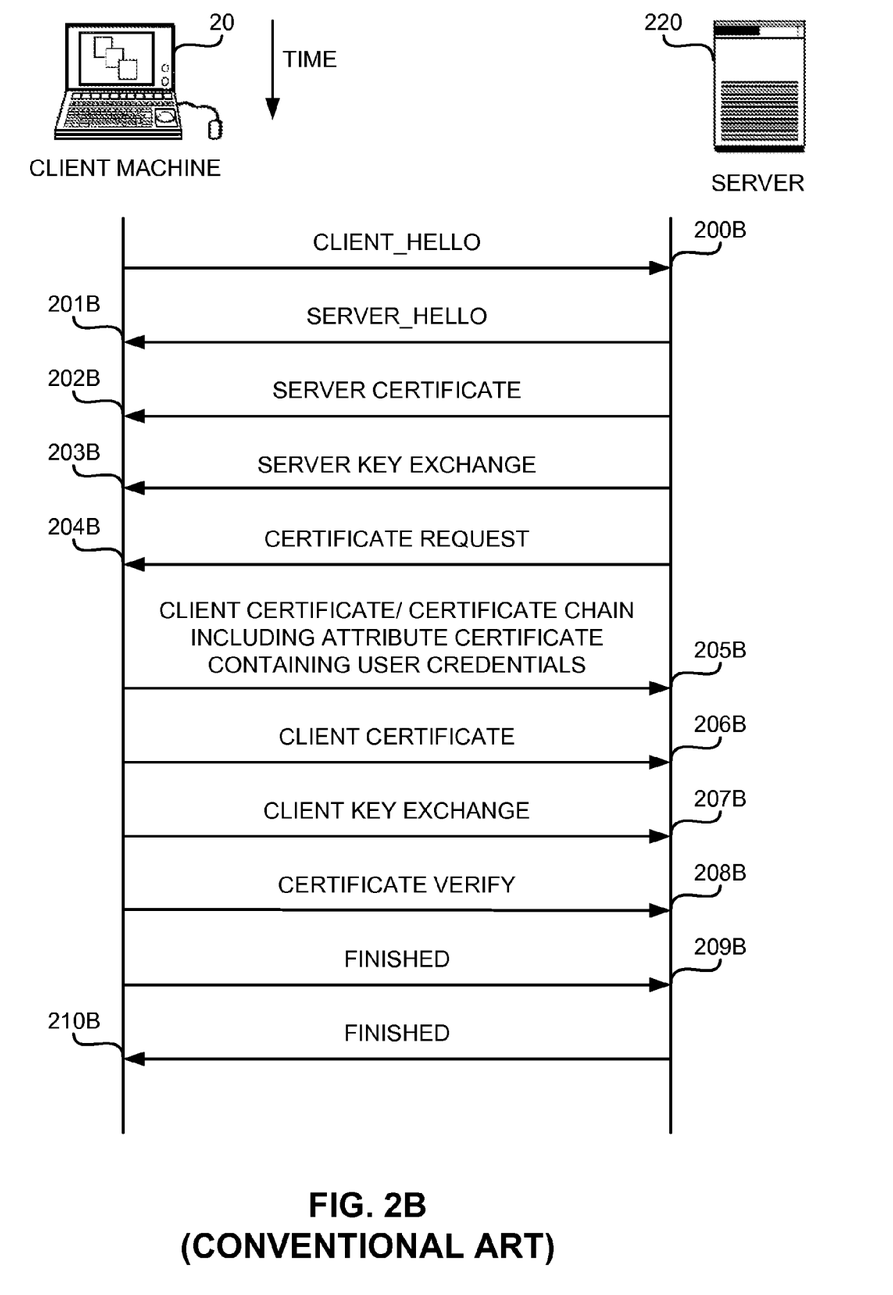
FIG. 2B illustrates a more detailed process of the standard process of authentication and FIGS. 3A and 3B illustrate the establishment of a connection between a client machine and a server, which does not require authenticating a user.

FIG. 2B illustrates a more detailed process of the standard process of authentication and encryption using SSL. As shown in FIG. 2B, the client sends a CLIENT_HELLO message to the server, identifying the latest version of the TLS protocol that the client supports. The client also sends a random lead generated number and a list of encryption and compression methods that are supported on the client, and which are compatible with TLS.

The server responds with a SERVER_HELLO message, which contains: the protocol version selected by the server, a random number sent by the client, an appropriate encryption algorithm and compression algorithm that are selected from the list sent by the client.

The server then sends a server certificate to the client. The server certificate includes the server's digital certificate, which depends on the encryption algorithm. The server also sends a server key exchange message, which contains an open key. The server also sends a certificate request message, and then an EOM, which defines the end of the handshake.

The client and the server then establish a client certificate/certificate chain, which includes the attribute certificate with the user credentials. Using the open key and randomly generated numbers, the client and the server both calculate a common secret key (207B). All the rest of the information about the key will be derived from the common secret key, where were generated by both the client and the server based on random numbers. The client then sends a message to the server, which tells the server that all the remaining information will be encrypted using the algorithms established during the handshake, and using the secret key (208B). The client then sends a FINISHED message (209B), which contains a hash value and the authentication code for the messages generated based on the previous handshake exchange.

The server then attempts to decrypt the finished message (210B) from the client and to confirm the hash and the code. If the process of decryption or the verification is impossible to perform, then the handshake is considered to have failed, and the connection will be broken.

The server also sends an encrypted FINISHED message, and the client also attempts to perform the decryption and verification, see http://en.wikipedia.org/wiki/Transport_Layer_Security, incorporated herein by reference in its entirety.

SUMMARY OF THE INVENTION

Accordingly, the present invention is related to a system, method and computer program product for connecting to a remote Virtual Environment without prior authentication that substantially obviates one or more of the disadvantages of the related art.

In one aspect, there is provided a method, system and computer program product for providing a secure connection between a client and a remote server to run a Virtual Environment (VE), including (a) establishing a repository for VE content on the remote server; (b) creating a data necessary for the VE to function; (c) generating a two key pairs that includes a VE key pair and a client key pair, wherein the VE key pair includes encryption and decryption keys, the client key pair includes decryption and encryption keys corresponding to encryption and decryption keys of the corresponding VE key pair and the two key pairs are used to provide a full duplex secure network channel between the client and the repository; (d) storing the data necessary for the VE to function as the VE content using data from the VE key pair in the repository; (e) receiving the address for accessing the stored data; and (f) from the client side, using the VE address and the client key pair to start the VE from the data necessary for the VE to function.

The client initiates VE support means necessary to run the VE on the client machine. The VE support means includes Virtuozzo-type code or a Virtual Machine. The client initiates VE support means necessary to run VE on the VE server/repository side. The VE support means includes MS terminal server, wherein a terminal session runs on the remote server and results are shown in a window on a local computer. The repository is implemented as a part of an online store intended for sales of VEs over the Internet.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The following definitions are generally used throughout this description:

Virtual Execution Environment (VEE)—a type of environment that supports program code execution, where at least a part of the real hardware and software required for running program code are presented as their virtual analogs. From the point of view or the user, that the code in VEE runs as if it were running on the real computing system.

Virtual Machine (VM)—a type of an isolated VEE running on the same physical Machine simultaneously, such as, for example, available from Microsoft Corp., VMware, Inc. or Parallels Software International, Inc., see application Ser. No. 11/139,787, Filed: May 31, 2005, incorporated herein by reference in its entirety. Each Virtual Machine instance executes its own OS kernel. Support of Virtual Machines is implemented using a Virtual Machine Monitor and/or a Hypervisor.

Hypervisor—control software having the highest privilege level for administrating hardware computer resources and Virtual Machines, such as described in application Ser. No. 12/143,893, incorporated herein by reference in its entirety.

Virtual Environment (VE)—is one type of a Virtual Execution Environment running on the same hardware system with a shared OS kernel and most of the system resources, where isolation of Virtual Environments is implemented on the namespace level. A VE acts as an isolated virtual server within a single machine, where multiple sets of application services are organized on a single hardware system by placing each into an isolated virtual container, for example, as described in application Ser. No. 10/703,594, incorporated herein by reference in its entirety. A VEE, such as a VE is implemented in, for example, Virtuozzo™ OS virtualization solution, available from SWsoft, Inc. (now Parallels Holdings, Ltd).

In the present invention, the user is granted secure access to a virtual execution environment, such as a virtual private server, or a virtual machine, without providing authentication data. This is done by encrypting all of the communication between the client and the server, such that the encryption itself act as a security mechanism, but other than the use of the appropriate cryptographic algorithm on the client side (and a matching decryption algorithm on the server side), no other authentication or user information is required. Various more or less robust algorithms for encryption can be used, such as AES, DES, Blowfish, 3DES, RSA, El Gamal, and so forth.

The user may, or may not, know the password needed to activate the cryptographic function. Different modes of access, including password-protection, can be used for access to a portion of security key pairs which is necessary for encryption/decryption algorithms to work. In any event, what the user needs to do is only utilize the cryptographic function provided to him to encrypt all the outgoing communication, and to decrypt the incoming communication. On the server side, if the encryption is not done correctly—either by using an incorrect cryptographic key, or by using the wrong algorithm, the incoming requests to the server will appear to be garbage. On the other hand, if the encryption process works correctly, then the server will be able "understand" the incoming requests, and will be able to respond to the requests. To be sure that encrypted data is correct, some pre-defined data can be used inside the text. This data should be detected inside decrypted plaintext, e.g., a known signature should be present in any particular pre-defined (or dynamically defined) block of data. Some other methods, such as steganography, can also be used.

On the user side, the incoming responses can be decrypted either using the same algorithm and/or the same key, or using a different algorithm and/or a different key, which is defined typically during creation of security key-pair (e.g., as a session key), and appropriate portion of the key pair can be "embedded" into VEE-stored data from one side, and stored by the client, on the client side.

As one particular embodiment, the user uses the security keys to process encrypted data exchange. A server repository, which processes the requests from clients and delivers the data to the client, might not use the security keys, if the user requests from the server only data that relates to the VEE and which is stored in encrypted form. Furthermore, if the client's request for data from the server is transmitted over an open channel, the client can use only a single key for decryption of the received data.

Figure 1:
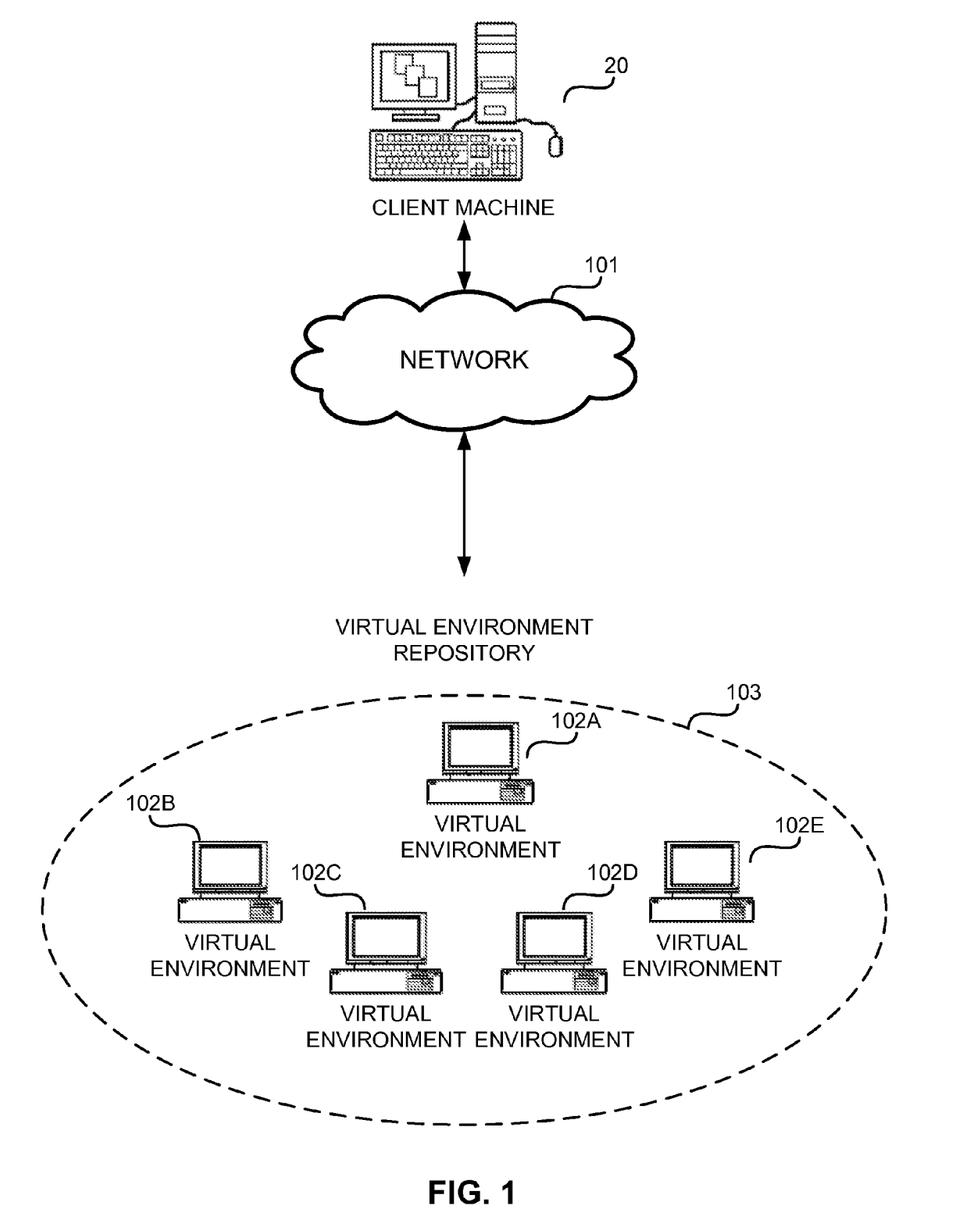
FIG. 1 illustrates an exemplary embodiment of the invention.

FIG. 1 illustrates an exemplary embodiment of the invention that includes one or more networked computers 20, such as a client machine shown in FIG. 1. The computers 20 are connected through a network 101 to a Virtual Execution Environment (VE or VEE) repository 103, which can include a number of Virtual Environments 102A-102E. The Virtual Environment 102 are generally created by users, or activated upon user request, and typically can include a system software, various user applications, and on, such that each Virtual Environment act as though it were a fully functional computer.

Once the Virtual Environment is created, the Virtual Environment can be located in the repository 103. The Virtual Environments can exist in several forms, for example, files that can be installed on a computer, and which are then activated. As another example, a working Virtual Environment can be created in the repository 103, which itself is located on the remote server. Data exchange between the user and the virtual machine or Virtual Environment, in this case, is implemented through a network connection as one example of a possible implementation, and encrypted image of a Virtual Environment, together with all the data, can be stored and then activated on the remote server. A token or tokens, needed to enable a secure connection for the data, can be used. As a further option, encryption of some or all of the data of the Virtual Environment can be done by using a token that is received by the Virtual Environment from a third party. Furthermore, in addition to encrypting the Virtual Environment and the Virtual Environment (VE) data, a relatively small separate data region can also be encrypted, for example, information about the location of the configuration files for a particular Virtual Environment.

The repository 103 can also be implemented as a centralized data storage, to which the user has access, for example, through a known network address and over a network.

Thus, a user can connect to several Virtual Environments through a single server. Also, different Virtual Environments can be stored on different physical machines, but access to them can be implemented through a single (or several) control servers, or directly through a network address. Note that in this case, remote servers are being used to store data, and the user therefore need not know the exact physical location of the data and the files. As such, data received from a user can be process through several interface procedures or several encryption keys for verifying the fact that the data can be successfully decrypted by using known digital certificates or known keys for the Virtual Environments.

The connection channel is established when a user attempts to send data using a connection protocol. The data is normally transmitted in an encrypted form, such that decryption of the data can be performed only by the user or by the Virtual Environment itself (if the Virtual Environment or virtual machine works on the server). If the data cannot be decrypted, then the connection is by definition useless.

The repository 103 can be implemented without an explicit authentication center or module, where all the attempts to access the data in the repository 103 can be performed directly, without involvement of an administrator. This, obviously, assumes that appropriate decoding methods for the data are present both on the client side and on the server side.

A number of embodiments for implementing the Virtual Environments 102, and using applications installed therein, will be discussed below:

As one embodiment, a secure channel for data transmission from a remote machine is established. The remote machine sends data over communication channel using its own built-in cryptographic keys, and the user, using his own keys, without an additional procedure for deriving and receiving the keys. Thus, when the user launches an application on a remote machine, it should not use any user credentials to establish access to the repository 103 and all that is need to be known in advance is the address of his own Virtual Environment. In one embodiment, when a Virtual Environment needs to be accessed (installed from remote data or migrated or even used as an application server) from a computer that is remote from the main data storage, the minimal set of software means, e.g., an interface procedure providing the user with communication channel to the remote machine and settings for the communications means are required. The interface procedure and, optionally, settings may be prepared and stored as a part of a VE on a remote server. Further, software means may be delivered to the user along with settings required for establishing connection, e.g., a server address, port number and so on. The access to the software means and settings may be provided using conventional procedures, including SSL connection, and so on.

The remote computer can have a minimal set of software applications and data installed on it, such that these are sufficient to start a Virtual Environment. Also, an interface procedure needs to be installed on the operating system side. A second interface procedure is used on a computer on the side of the data storage.

In another embodiment, if the data of a Virtual Environment is stored on a remote server-repository in an encrypted form, but is used locally on a client computer, it is possible to only decrypt them locally, for example, through a built-in program interface. Then, any data transmitted (whether on an open channel or on a secure channel) remains encrypted, and there is no need to encrypt/decrypt the data on the server side. Downloading the data can be done either partly or fully. For example, data can be downloaded on a file basis, on a block basis, on a folder basis, and so on. To address the data, a direct address can be used, which points to the encrypted content of the Virtual Environment on the remote server's repository. In another embodiment, the server stores data mounted locally using a mount point remote from file system, such as NFS or SMB file server, and encrypted data is accessed by programs from local computer via the mount point. Thus, such an access regime may be termed "local access" in the context of the present discussion.

The computer system also includes a network 101, which can be the internet, an intranet, a WAN, a SAN, a LAN, etc. The network can also use different communications protocols, such as TCP/IP, FTP, HTTP, SMB, etc.

As one embodiment, the Virtual Environment can be launched in a "coherence" regime, such as described in U.S. patent application Ser. No. 11/739,131, filed on Apr. 24, 2007, incorporated herein by reference, and the user sees only integrated application windows on his desktop. Such a configuration is one of the examples of a typical use of the present invention, where the user needs to have the ability to remotely access the data structures of the Virtual Environment. This tends to take place when the Virtual Environment runs on the client side, or remotely, or possibly remotely at least relative to some of the objects of the Virtual Environment.

As one example, on the user side, and on the remote computer (server) side, communication means are installed, such that they do not require mutual authentication and authorization. For example, if the user knows the address of the Virtual Environment in the repository 103, to which he wants to gain access, this is sufficient to launch the VEE on client machine. Knowing the address of the VE on the server-repository, it is possible to gain access to the VE and launch applications within the VE either remotely or on the client machine, i.e., applications of the client's virtual machine. Such communication means function so that when a communications channel is attempted to established, the data stream from the user side is either accepted, and data is sent in response back to the user, based on the assumption that the channel exists, or are ignored if the data does not satisfy pre-established criteria, for example, if the encryption key is incorrect.

Correspondingly, the algorithm for receiving data on the user side is similar. In other words, the received data is either accepted, or is ignored, if the server that sends the data does not satisfy the requirements (for example, where the encryption key that is used to encrypt the data is wrong, and the data cannot be decrypted).

Therefore, logically, the channel can be viewed as a permanently open channel. Nevertheless, under certain circumstances, to establish a connection it is necessary to utilize a network communications protocol, for example, TCP/IP during an initial stage of checking for the presence of the physical channel and the connection through the channel, and the possibility of reliable data transmission. The encryption/decryption required by this embodiment can be performed inside a dedicated program or using hardware-supported interfaces transparently for the client computer and for the VE.

As one embodiment of the invention, on one of the physical machines, a Virtual Environment is created that includes two interface procedures that are built into the interface for accessing data. The interface (access module) includes software or hardware mechanisms, or a combination thereof, which process and redirect a client's request. The interface works transparently, and the user does not need to have direct control over the interface. The interface can use encryption and/or decryption keys embedded in the software or accessible only to the interface.

The interface procedures provide for a secure data exchange between them. To do this, during installation and during the functionality stage, on the same or different physical machines, digital certificates can be used, data identifiers, and/or encryption/decryption keys, which provide for security of the transmitted data. In one embodiment, the interface can also include network virtualization means, such as virtual network adapters, which corresponds to a real network configuration in which the remote Virtual Environment is expected to be used. In other words, as one example, data exchange through virtual network adapters can be performed. This is different from traditional SSL (secure socket layer) technology because it does not require an initial key exchange procedure (during SSL connection establishment), which is required for SSL to work.

As yet another aspect, a single such interface procedure can be used, with several different keys for encryption/decryption. This means that on the same IP address that corresponds to one physical machine, several different independent and secure channels for data transmission can be implemented. The address can be not only IP address, but can also include some relative information, for example, generic URL or file path for locally mounted remote server.

If necessary, previously defined network settings can be reconfigured, such as IP address of the Virtual Environment, or adapting the interface procedure to the parameters of the drivers of the network equipment. As such, a ready-to-use network interface is formed, that does not require an exchange of keys and/or user identification data when the channel for data transmission is used.

Figure 3A:
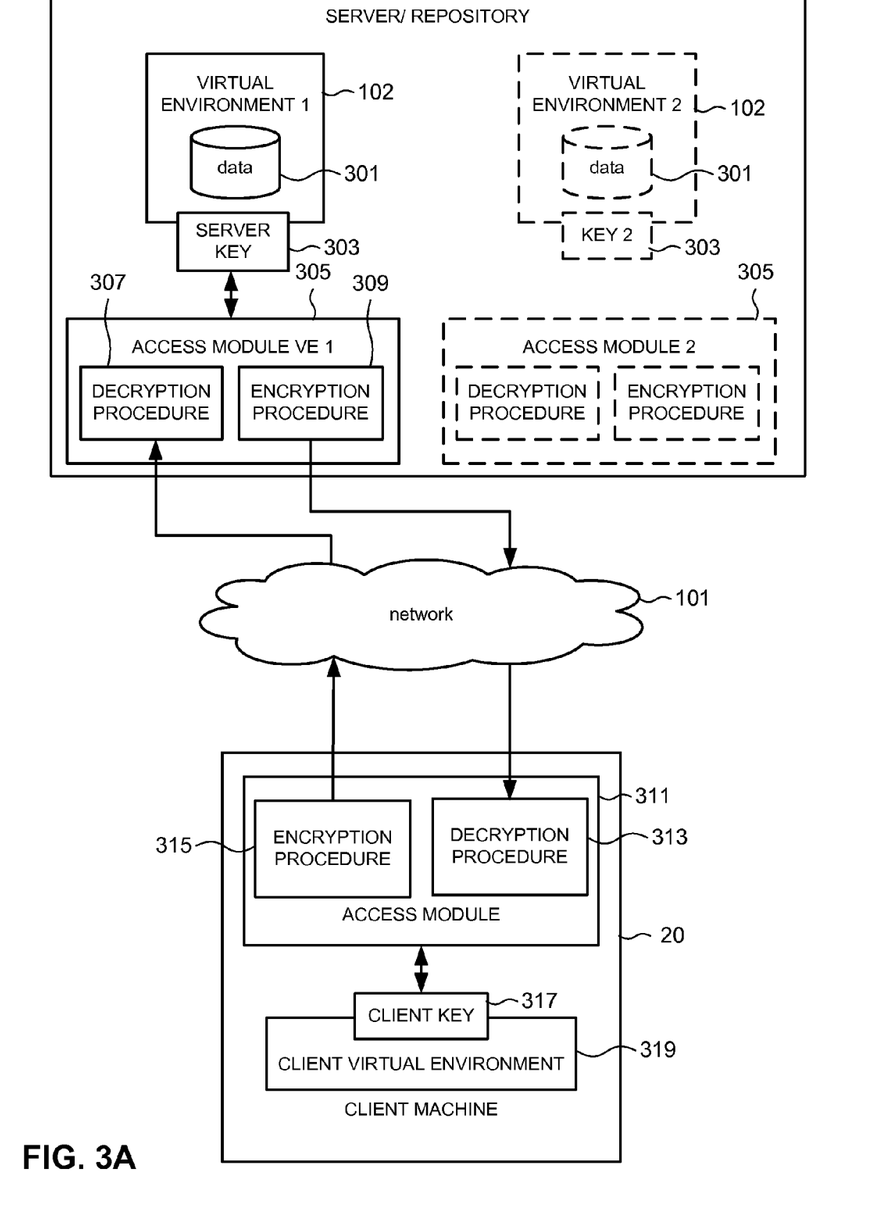
Figure 3B:
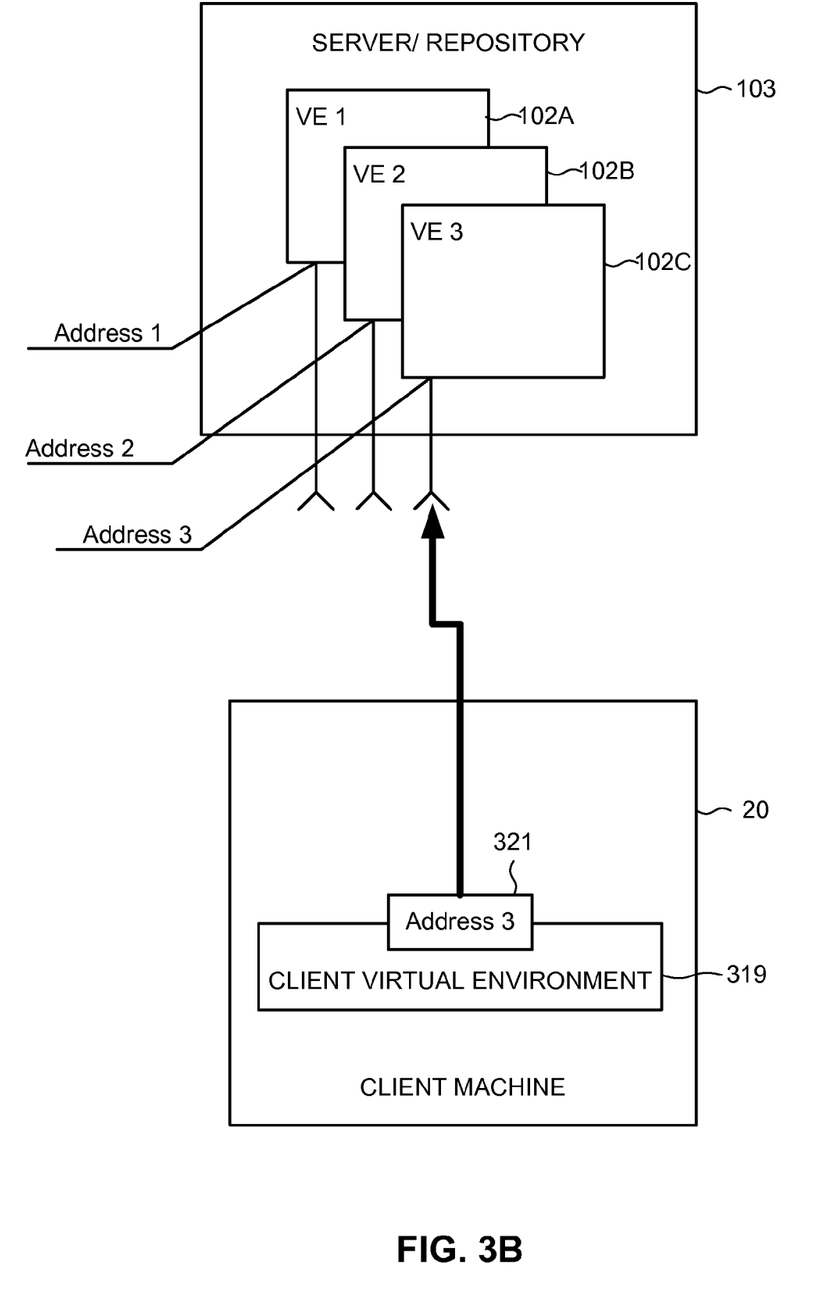

FIGS. 3A and 3B illustrate the establishment of a connection between a client machine and a server, which does not require authenticating a user. In this case, a virtual or real network adapter can be used to implement the access. The authentication and encryption can be transferred to a hardware level, in other words, the virtual or real network adapter can include the encryption. Each Virtual Environment can have its own virtual network adapter, or a single virtual network adapter can service several Virtual Environments. The environments themselves can then handle the authentication and encryption.

To establish the connection, a user uses a known (to him) special key that does not require authentication. This is achieved by having a portion of the key on the server. When establishing the connection, the user addresses the object being accessed (e.g., virtual machine image data) directly via the network by using a key (or token) for encryption of the data stream. The object uses the part of the key, or a certificate, for decryption of the data stream. Given a successful decryption, the data stream can be processed and a response to the user generated. If the decryption fails, the data stream from the user is ignored. Thus, no authorization is used, but only cryptographic keys, or digital certificates, when the data stream is received.

As shown in FIG. 3A, a user computer 20 includes a client side Virtual Environment access means 319, and a client key 317. An access module 313, such as implemented inside a virtual network adapter or client computer OS includes an encryption routine 315, and a decryption routine 311. Client machine communicates with a server/repository 103 through a network 101, such as the Internet, a LAN, a WAN, a SAN, etc. On the repository side 103, Virtual Environments 102 store user data 301. Server side key 303 which is typically embedded into virtual environment 102 is used in the access module 305. The access module 305 includes an encryption procedure 309 and a decryption procedure 307.

FIG. 3B illustrates another example, where the repository 103 includes three Virtual Environments, each one having its own address, e.g., IP address or URL. On the client side, the Virtual Environment access means 319 attempts to communicate using the address 321 which is known to client as an address associated with, e.g., VE 102C. Depending on the specified address, one of the Virtual Environments 102A-102C, on the server side, would be connected to.

In one embodiment, data accessible to the user can be stored in a web application framework, such as HTML:: Mason, StoryServer or even PHP, where the data is stored as a BLOB (Binary Large Object) or a single entity of binary data and an identifier corresponding to the BLOB. The identifier itself identifies a chunk of data in the BLOB that is meaningful for the user that requests identifier.

When using such a storage system and the principles of the invention, a traditional RSA algorithm may be used for implicit user authentication. In this way, the identifier itself may be read by any person. To provide verification of the identifier or even to protect identifier from corruption, the identifier may be signed or at least partially encrypted with encryption key from the key pair, where decryption key is known to the user. This feature is, strictly speaking, not required. Using the identifier or a decrypted identifier, the user can try to access the meaningful part of the BLOB when the user data are stored. Here, the BLOB itself can have links or stubs or other directory-like data providing access to other storages or to separate parts of the BLOB. It should be noted that the BLOB can be encrypted and in this case the decryption key or decryption method would be accessed by the user.

If the user holds a secret key or any other method for decryption of the BLOB and/or identifier, the user can correctly read meaningful data of the BLOB and associated data. Also, if the user's request to the BLOB can be interpreted as sensible from the point of view of data (e.g., user asks to activated link stored in the BLOB), the user authentication is successful. If not (e.g., the user asks once or repeatedly to activate random data as a link) the authentication has failed. In case of successful authentication, the system can mark this fact, e.g., in a log file or provide additional privileges to the user. As another option, successful authentication means that user can access specified data (and only specified data). In the same way, if authentication has failed, the system can break communication cannel or can perform no actions since the user cannot access data stored in the BLOB.

Figure 4:
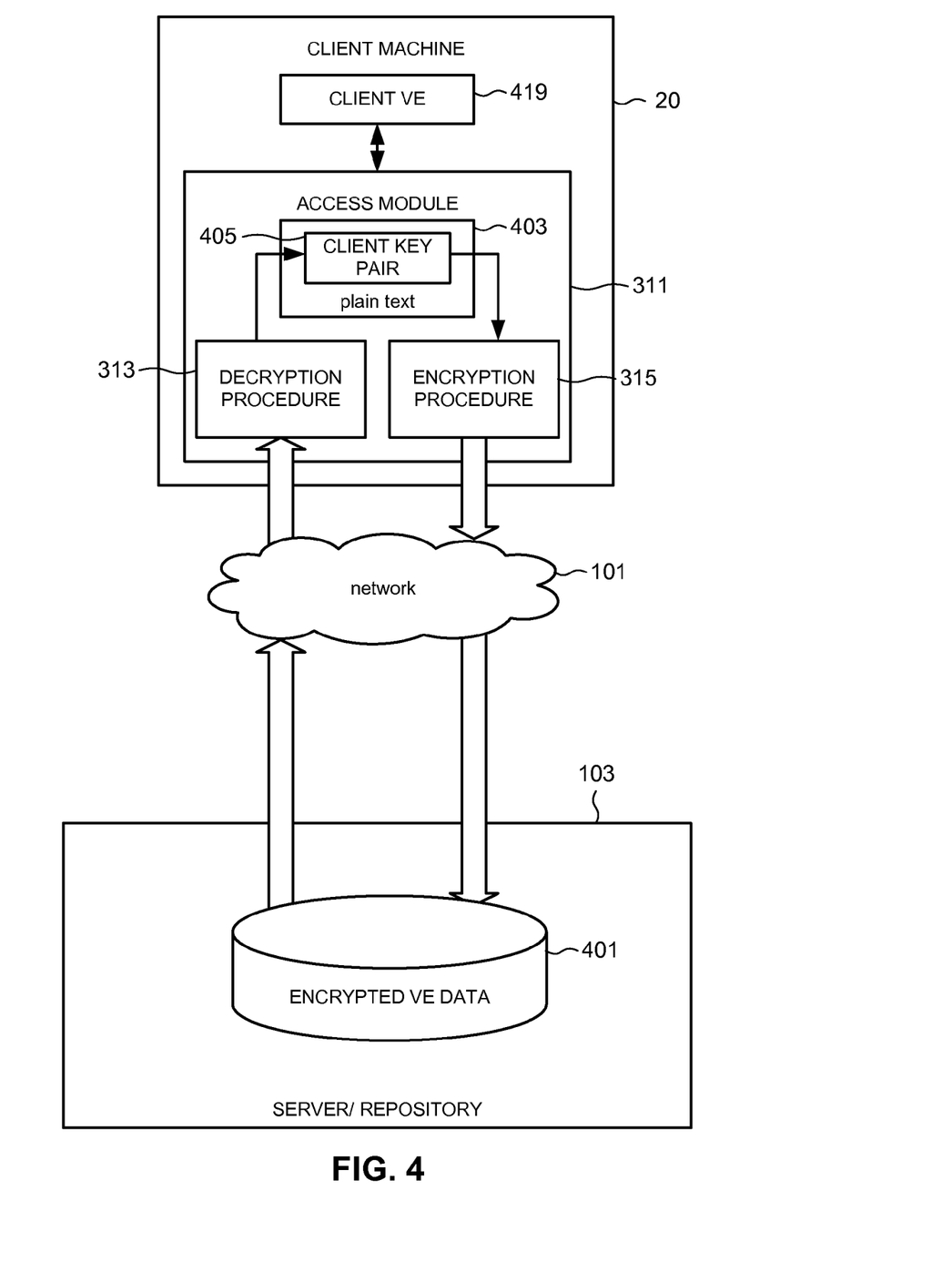
FIG. 4 illustrates how the data stream between a client and a server is handled.

FIG. 4 illustrates how the data stream between a client and a server is handled, using the approach described herein, which does not require authentication of the user. As shown in FIG. 4, client machine 20 communicates with a server, or repository 103, which stores encrypted data 401. The Virtual Environment 419 is run on the client side and uses an access module, or virtual or real network adapter 311. The adapter 311 uses a one or more keys 405 to convert plain text 403 into an encrypted data stream. Similarly, the keys 405 can be used to decrypt data received from the repository 103.

Figure 5:
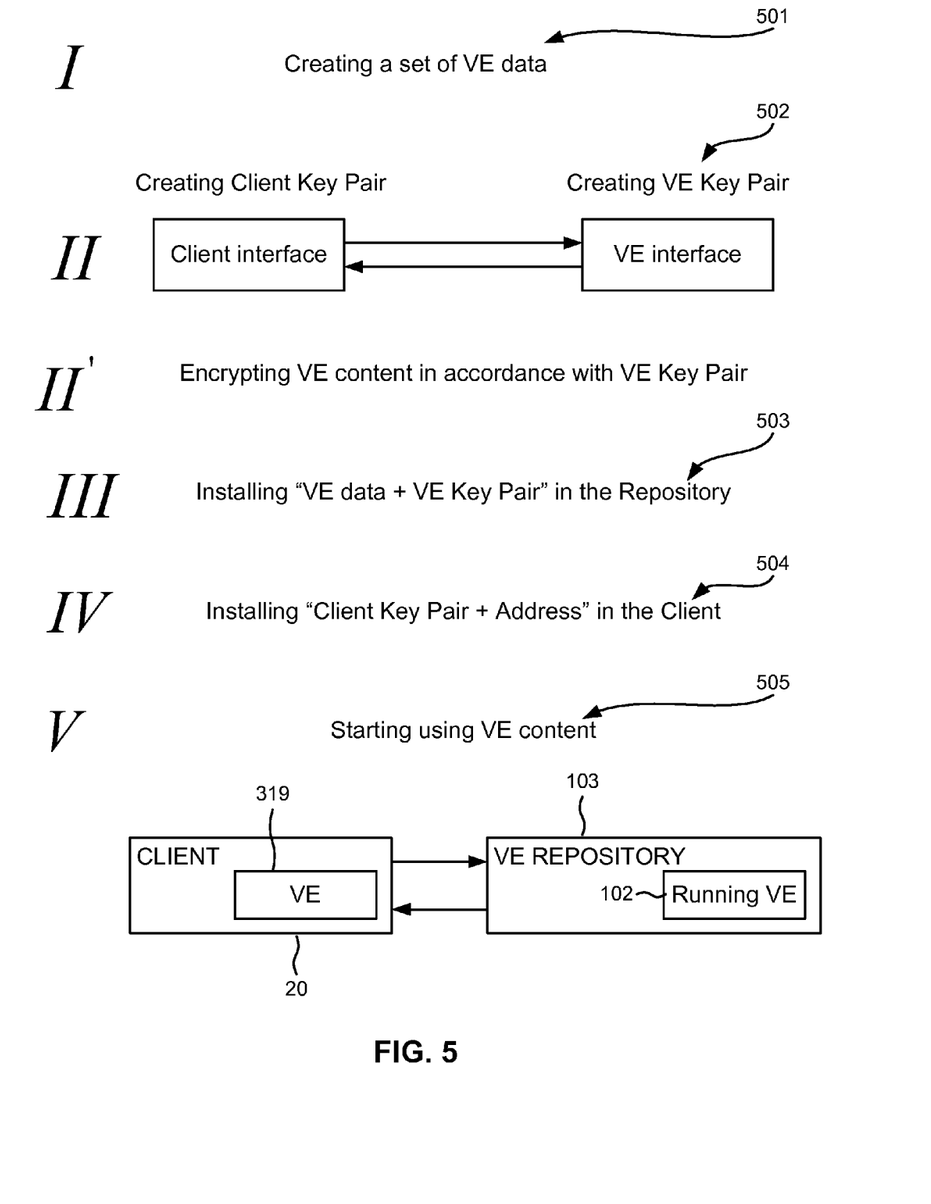
FIG. 5 is another illustration of the process of accessing data on a remote server, that does not use authentication or authorization of the user.

FIG. 5 is another illustration of the process of accessing data on a remote server, that does not use authentication or authorization of the user. As shown in FIG. 5, first, VE data necessary for VE to function is created in step 501, see also 401 in FIG. 4. Examples of such VE data include registry contents and registry hives, shared areas with files common for multiple VEs, private areas with files specific to a particular user, identification data for the particular VE, any backup data and parameters, content of a disk partition (if a partition is used), if we use registry—content of registry, database contents if a database is used, any OS system files, boot records, partition records, OS application files, application files, shared libraries, non-shared libraries, DLLs, executable files, drivers, modules, config files, xml files, http files and so on.

In case of asymmetric cryptography, in step 502, two pairs of encryption/decryption keys are created. Two keys, encryption and decryption, one from each pair are distributed to client as "a client key pair", and other two keys are distributed to the VE as "a VE key pair". The content of the Virtual Environment is then encrypted using the VE encryption key from the VE key pair. In step 503, VE data and VE key pair are installed in the repository 103, and an address of this installation is saved in step 504.

On the client side, the client key pair and an address (necessary to access the VE data in repository) are installed, see step 504. In step 505, VE can be started on repository server, on another server or on client computer, and encrypted VE content can then be transmitted back and forth between the server and the client, as shown in FIG. 5.

It should also be noted that although the discussion above is in terms of a client/server model where the server is remote, this need not always be the case. For example, the user can access a service on a locally located virtual machine or server, where no authentication is needed, other than the use of the encryption mechanism described above.

Also, various hardware devices for access control and/or encryption can be used, including smartcards, and data for encryption, the address data and keypairs produced in form suitable for these devices, optionally, by themselves. Also, in the repository, data for VE functioning and data, related to access, encryption, keypair/etc can be stored in the same place (e.g., in a single BLOB) or separately. Also, the client can be a mobile phone with appropriate software and hardware means, a PDA, a laptop, etc. The repository can be a network-accessible distributed storage, with or without fault tolerant features and redundancy, For example, (N,K) algorithms, such as described in application Ser. No. 11/004,078, Filed: Dec. 6, 2004, entitled FAULT TOLERANT DISTRIBUTED STORAGE METHOD AND CONTROLLER USING (N,K) ALGORITHMS, incorporated herein by reference in its entirety, with or without means for running/migrating the VE. The encryption means can be moved to client or 3-d computer with appropriate communication means from client and server sides.

Figure 6:
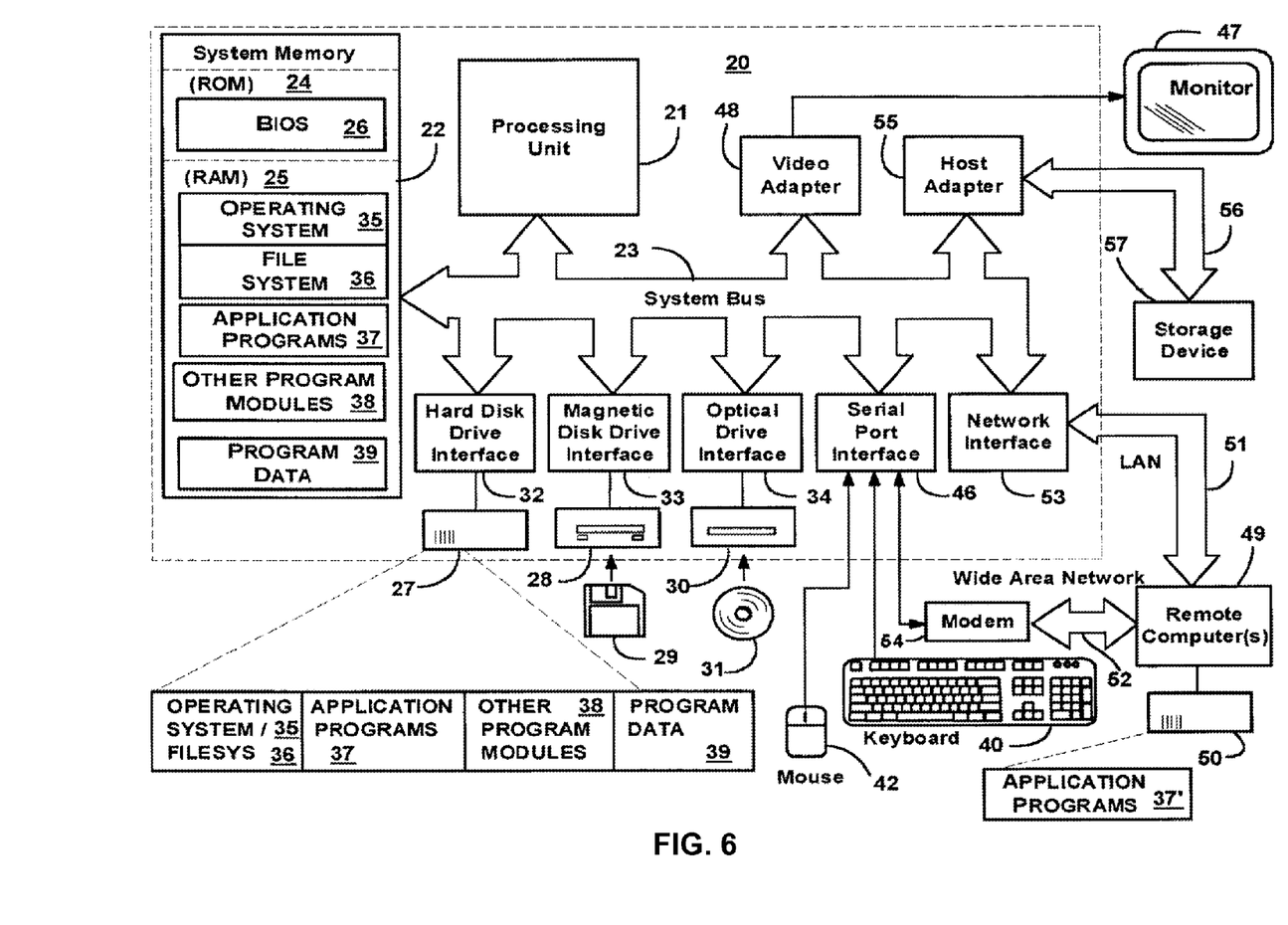
FIG. 6 illustrates an exemplary computer system on which the invention may be implemented.

With reference to FIG. 6, an exemplary system for implementing the invention includes a general purpose computing device in the form of a computer or server 20 (or 220) or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 6. The logical connections depicted in FIG. 6 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for providing data access for a client on shared storage with a unique address, the method comprising the steps of:
   (A) data preparation and distribution on a shared server, including
      (i) generating a pair of encryption/decryption keys;
      (ii) on the client, selecting plaintext data to be stored on the shared storage;
      (iii) on the server, preparing server data need to run a server program, and embedding the encryption/decryption key pair into the server data;
      (iv) encrypting the plaintext data into cyphertext data using an encryption key from the pair;
      (v) storing the cyphertext data on the shared storage;
      (vi) receiving the unique address of the stored cyphertext data inside the shared storage for direct access of the encrypted data from the client;
      (vii) storing the encryption/decryption key pair on the client;
   (B) data utilization on the shared server, including
      (i) running a server program that utilizes the cyphertext data and the server data and communicates with the client program using the cyphertext data;
      (ii) for accessing the cyphertext data from the client, using the unique address to directly obtain data from the shared storage by client, without authentication, and using a decryption key from the encryption/decryption key pair to decrypt the cyphertext data;
      (iii) for providing the cyphertext data from the shared server to the client, using an embedded key pair to encrypt the plaintext data, and storing it in the shared storage, wherein the client accesses the cyphertext data without authentication;
   (C) data utilization on the client, including
      (i) starting a client program that accesses the shared storage without authentication, sends requests to the shared storage, and receives responses from the shared storage, wherein:
      (ii) in response to a read request from the client program to the server program, directly obtaining a portion of the cyphertext data from the shared storage by sending a request with offset/size parameters using the unique address, and decrypting cyphertext data using the decryption key from the encryption/decryption pair;
      (iii) in response to a write request from the client program, encrypting a portion of the plaintext data using the encryption key from the encryption/decryption key pair, and storing the cyphertext data by sending the write request with offset/size parameters using the unique address.

2. The method of claim 1, wherein the server is running a Virtual Machine under control of a Virtual Machine Monitor or a Hypervisor, and the data is a Virtual Machine image file.

3. The method of claim 1, wherein the client program stores commands to the server in encrypted form, and wherein responses from the server use the cyphertext data stored on the shared storage.

4. The method of claim 3, wherein the commands are activated when either the server or the client is not active.

5. The method of claim 1, wherein the client initiates a virtual environment on the client side using the cyphertext data from the shared storage.

6. The method of claim 5, wherein the virtual environment includes a Virtual Machine.

7. The method of claim 1, wherein
   the client initiates a virtual environment on the server side using the cyphertext data from the shared storage.

8. The method of claim 7, wherein an identifier identifies a portion of data in the BLOB that is requested by the user.

9. The method of claim 1, wherein the cyphertext data accessible to the client is stored as a BLOB (Binary Large Object).

10. A system for providing data access for a client on shared storage with a unique address, the system comprising a processor and computer code running on the processor for implementing the steps of:
   (A) data preparation and distribution on a server, including
      (i) generating a first pair of encryption/decryption keys;
      (ii) selecting a plaintext data to be stored on the shared storage;
      (iii) encrypting of the plaintext data using the encryption key from the first pair into cyphertext data;
      (iv) storing the cyphertext data on the shared storage;
      (v) receiving, from the client, the unique address of the stored cyphertext data in the shared storage for direct access of the cyphertext data;
   (B) data utilization on the client, including
      (i) starting a client program that access the cyphertext data without authentication;
      (ii) in response to a read request with offset/size parameters from the client program, directly obtaining a portion of the cyphertext data from the shared storage by sending the read request using the unique address, and decrypting the cyphertext data using the decryption key from the first pair;
      (iii) in response to a write request from the client program, encrypting portion of the plaintext data using the encryption key from the first pair, and storing the cyphertext data by sending the write request with offset/size parameters and the unique address to the shared storage.

11. The method of claim 10, wherein the server is running a Virtual Machine under control of a Virtual Machine Monitor or a Hypervisor, and the data is a Virtual Machine image file.

\* \* \* \* \*